R. F. BACON.
RECOVERY OF CUPROUS SULFID FROM ORES AND THE LIKE.
APPLICATION FILED JAN. 24, 1914.
1,151,234.
Patented Aug. 24, 1915.
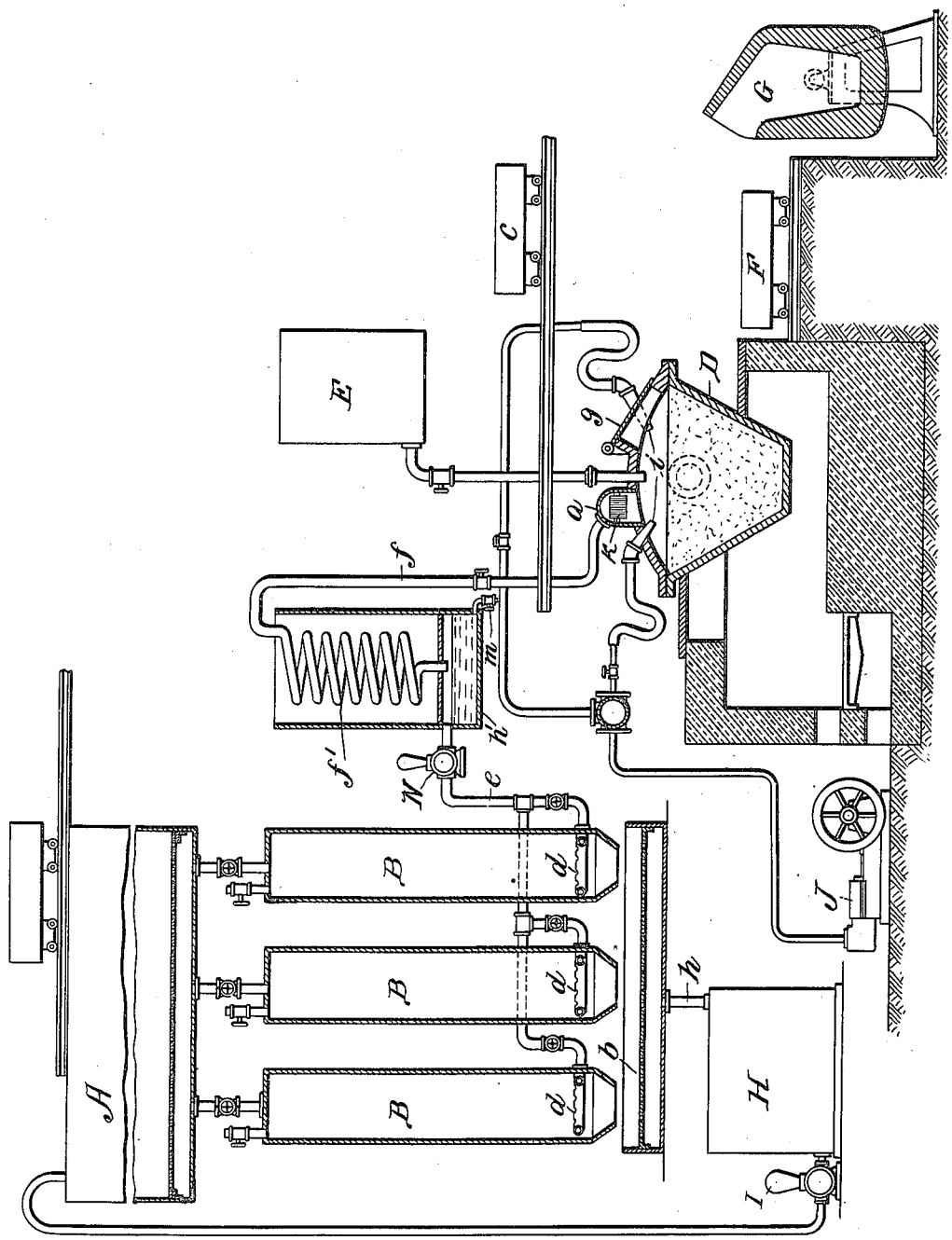

UNITED STATES PATENT OFFICE.

RAYMOND F. BACON, OF PITTSBURGH, PENNSYLVANIA, ASSIGNOR TO METALS RESEARCH COMPANY, OF NEW YORK, N. Y., A CORPORATION OF MAINE.

RECOVERY OF CUPROUS SULFID FROM ORES AND THE LIKE.

1,151,234.

Specification of Letters Patent. Patented Aug. 24, 1915.

Application filed January 24, 1914. Serial No. 814,147.

*To all whom it may concern:*

Be it known that I, RAYMOND F. BACON, a citizen of the United States, residing at No. 4909 Forbes street, Pittsburgh, Allegheny county, State of Pennsylvania, have invented certain new and useful Improvements in Recovery of Cuprous Sulfid from Ores and the like; and I do hereby declare the following to be a full, clear, and exact description of the invention, such as will enable others skilled in the art to which it appertains to make and use the same.

The present invention relates to certain improvements in the metallurgy of copper, and particularly to a cyclic system, wherein cupric sulfid is reduced to cuprous sulfid by reaction, at a relatively low temperature, with hydrocarbons and with the simultaneous decomposition of the hydrocarbons employed; whereupon the released sulfur of the cupric sulfid and the released hydrogen of the hydrocarbon unite to form hydrogen sulfid. The hydrogen sulfid thus formed is, in turn, employed to precipitate cupric sulfid at any suitable pressure from a solution obtained in any usual or approved manner by the lixiviation of copper as, for instance, by means of sulfuric acid or hydrochloric acid, or other suitable solvent, and which contains copper salts (say copper sulfate, or copper chlorid) capable of being precipitated out as cupric sulfid by the action of hydrogen sulfid. There is thus produced an additional quantity of cupric sulfid adapted to be reduced to cuprous sulfid by reaction with hydrocarbon as before, and with the production of a further amount of hydrogen sulfid, which may then be used for the treatment of a further quantity of copper salt solution; and so on, in like succession.

To produce a quantity of hydrogen sulfid sufficient to precipitate from the copper salt solution an amount of cupric sulfid equal to that reduced to cuprous sulfid in the first stage of the process, it will be necessary to add each time to the batch of cupric sulfid, an amount of elemental sulfur equal to one-half of the sulfur of the cupric sulfid treated, and the hydrocarbon employed must be sufficient to react quantitatively upon the elemental sulfur as well as upon the cupric sulfid. The cuprous sulfid ultimately obtained, will be in admixture with the carbon of the decomposed hydrocarbon.

Metallic copper may be obtained from the cuprous sulfid in any suitable way, as, for instance, by adding it to the molten charge of a copper matte converter.

The precipitation of cupric sulfid from the copper salt solution by the action of the hydrogen sulfid restores to the spent solution a quantity of acid, thereby correspondingly enhancing its value as a subsequent leaching agent, such further appropriate quantity of acid being added thereto as may suffice to supply inevitable losses and as will bring it up to its desired availability for leaching a new body of ore.

If any ferric sulfate is likewise present in the copper salt solution treated, it is reduced to ferrous sulfate, with the precipitation of a corresponding quantity of elemental sulfur, and the elemental sulfur thus precipitated with the cupric sulfid is itself an additional source of hydrogen sulfid when acted upon by the hydrocarbon in the next succeeding cycle.

In carrying out the invention, the copper ore to be treated is leached in any well known and desired manner. The resulting solution of copper may then be drawn off from the leaching vat and subjected to the action of the hydrogen sulfid, as, for instance, by permitting the solution to pass downwardly through a suitable tower at whose lower portion the hydrogen sulfid is admitted.

The hydrogen sulfid is itself produced by treating with hydrocarbon a body of cupric sulfid and sulfur in a suitable vessel which may conveniently have the form and dimensions of an ordinary still, adapted to be heated, as, for instance, externally by direct firing, in the usual manner, or internally, and which is provided with the necessary means for admitting the charge of cupric sulfid and sulfur, for applying hydrocarbon, and for the removal of the residual products of the treatment, and also with means for conducting off the hydrogen sulfid.

The cupric sulfid will usually contain a large quantity of moisture, and in fact, will usually be the precipitate from the precipitation tower. Accordingly, the containing vessel or still should have a sufficient capacity, with respect to the charge, to take care of such foaming as is incident to the operation, or any suitable means may be provided to suppress the foam or to prevent it from rising to too high a level above the upper surface of the charge; as, for instance, one or more air jets of high pressure may be directed upon the forming foam layer so as to break it up and release the imprisoned gases. So also, in order to prevent the condensation and return to the receptacle and charge of any water that has been driven off in the form of steam during the operation, the still or receptacle may be provided, in its interior and at the upper part thereof with a suitable insert or aluminum, or other suitable material, through which the hydrogen sulfid and other vapors may freely pass on their way to the exit pipe of the still and which, by reason of its location, is at such a temperature as to intercept and reconvert into steam any water which, condensing out of the escaping vapors would tend to return to the charge.

When a solid or liquid hydrocarbon is employed, it may be either mixed with the cupric sulfid and sulfur and charged therewith into the receiving vessel or still, or it may be admitted into the upper part of the vessel and permitted to drop upon the heated cupric sulfid and sulfur. In practice, it is usually preferable to thus admit the liquid hydrocarbon upon the top of the charge, rather than to mix it therewith in the first instance, for the reason that by dropping the hydrocarbon upon the top of the charge, a quantitative reduction of the cupric sulfid to cuprous sulfid can be affected with a lesser supply of hydrocarbon, so as to reduce, and in some instances, to practically avoid the presence in the still, at the termination of the operation, of any large quantity of hydrocarbon to be thereafter recovered by distillation. It will be usually desirable to employ an amount of hydrocarbon somewhat in excess of that theoretically required for the reaction. It is also feasible to reduce the cupric sulfid and obtain the hydrogen sulfid by showering the mixture of cupric sulfid and sulfur through an atmosphere of hydrocarbon vapor, say vaporized mineral oil; a convenient mode of thus showering the mixture of cupric sulfid and sulfur through the mineral oil vapor may consist, for instance, of a rotatory horizontal or inclined cylinder, suitably heated, and provided with means for admitting the mineral oil vapor at one end thereof and allowing the volatile products of the reaction to take their exit at the other end, the cylinder being further provided with longitudinal ledges projecting inward and adapted to raise the cupric sulfid and sulfur mixture constituting the charge of the rotary cylinder and permitting it to drop, as will be readily understood.

While, as hereinbefore indicated, the reaction is not dependent upon the use of any particular hydrocarbon, it is found feasible, convenient, and economical, in practice, to use what are known generally in the arts, as hydrocarbon residues, as, for instance, oils from which the lighter and more valuable distillates, such as gasolene, kerosene, and the lighter lubricating oils have been driven off. The hydrocarbon residues thus obtainable from the natural petroleums and other oils having a similar composition, such as shale oils, are entirely adapted to the purpose, and may be specified as illustrative of those which may find ready acceptance for commercial uses; so also, there are available for the uses of the invention naphthalene, and also substances which, on heating, give considerable quantities of hydrocarbons, as, for instance, asphalts and bitumens (natural and artificial) coal tar, water gas tar, wood resins, and rosin oil. Of course, any of the valuable hydrocarbon distillates may be used where the question of cost is of less importance.

In practice, it is found that the reduction of the precipitated cupric sulfid begins to take place at a relatively low temperature, somewhere between 50° C. and 100° C. It proceeds more rapidly at higher temperatures, and the process may be conducted to special advantage at temperatures representing the boiling point of the hydrocarbons usually employed,—that is to say, temperatures ranging from 300° C. to 360° C. which will represent approximately the usual commercial temperatures. Inasmuch as the dissociation of hydrogen sulfid begins at about 400° C. and becomes increasingly important at higher temperatures, it will be preferable, to restrict the temperature accordingly, not permitting it to rise above say, 500° C., so that there may be no material loss in the recovery of the hydrogen sulfid.

Before admitting the precipitated cupric sulfid, in the cyclic operation, to the vessel or still with the hydrocarbon, the precipitate may be subjected to one or more washing operations, for the purpose of recovering any part of the spent leaching solution which may be economically recovered in this manner; and, when the wash-water has been used for a sufficient number of times, it may be added to the lixiviating solution in the treatment of the ore in the lixiviation tank. It may be said in this connection, however, that except for the purpose referred to, it is not of advantage to wash the precipitate, for the reason that any sulfuric acid which may be carried by it will not interfere with the reaction between the cupric sulfid and the hydrocarbon.

In the accompanying drawing is illustrated diagrammatically, apparatus of a type adapted for the practice of the invention, although it will be understood that the illustration is merely representative of many arrangements which might be employed for the purpose.

In the drawing, A indicates a lixiviation tank, of the usual kind, and B indicates a suitable number of towers communicating with the lixiviation tank and serving to receive the copper sulfate solution or copper chlorid solution therefrom. The towers B discharge upon a perforated grid $b$ or the like, upon which the precipitate collects, and from which after being filter-pressed it may be ultimately removed in any suitable manner, to the car C, or the like, which conveys it to the still or reaction vessel D. Above the grid $b$, the hydrogen sulfid (and whatever vapors are carried therein) is admitted into the towers, as, for instance, through annular perforated rings $d$ communicating with the pipe $e$.

E indicates a suitable receptacle for supplying the hydrocarbon to the reaction vessel or still D, and the still is provided with a closable charging door $g$, through which the precipitate may be conveniently admitted. The reaction vessel or still D may be located within a suitable furnace setting, so as to be heated externally, and, for conveniently emptying it, at the termination of the reaction period, it may be placed upon trunnions, so located that the solid products of the reaction, consisting mainly of cuprous sulfid and of the carbon of the decomposed hydrocarbon may be discharged through the door $g$ and into any suitable conveyer, as, for instance, the car F. The copper may be recovered in a metallic state, in any suitable manner, as for instance, by adding the mixture to the molten charge of a copper matte converter.

From below the grid $b$, the spent leaching solution, from which the copper has been precipitated, as cupric sulfid, may be conducted by a pipe $h$ to the sump H. As hereinbefore indicated, the precipitation of the cupric sulfid by the hydrogen sulfid has given to the solution a further quantity of free sulfuric acid, and, in the sump, or in the lixiviation tank itself, any additional quantity of acid may be supplied suitable to the particular ore under treatment. From the sump, the solution may be supplied to the lixiviation tank in any suitable manner, as, for instance, by the pump I.

Before returning the solution to the lixiviation tank, care must be taken to insure that the solution contains no important amount of hydrogen sulfid, inasmuch as any hydrogen sulfid present therein would react with the dissolved sulphate or chloride, to produce cupric sulfid, which, being insoluble in the leaching liquor, would be lost in the gangue. A convenient and suitable method for avoiding this difficulty is to add to the spent solution as it collects in the sump or afterward before its return to the lixiviation tank, a sufficient additional quantity of the unspent solution to precipitate whatever hydrogen sulfid is present.

The high pressure air jets $i$ for keeping down the foam in the reaction vessel or still D may be supplied with air in any suitable manner, as, for instance, from the pump J. Within the head $a$ of the reaction vessel or still D is contained the insert $k$, heretobefore referred to, which may conveniently consist of a structure of aluminum or other suitable material adapted to be raised to a high heat by the escaping hydrogen sulfid and accompanying vapors on their way to the exit pipe $f$ of the vessel D, whereby, as hereinbefore explained, any water which would tend to condense out of the vapors and to return to the charge is prevented from so doing. From the pipe $f$ the hydrogen sulfid and accompanying vapors pass through the condensing worm $f'$, and the water and other liquid condensates thus separated, are carried off from the collecting chamber $h'$, from time to time or continuously through the valved pipe $m$, while the hydrogen sulfid is pumped to the rings $d$ by means of the pump N.

It will, of course, be understood that the several pipes serving the apparatus may be provided with suitable regulating or controlling cocks as shown, and with suitable flexible or removable connections and couplings to permit the tilting of the vessel D, when desired.

What I claim is:

1. The method of recovering cuprous sulfid from ores and the like, which consists in leaching out the copper therefrom by a suitable solvent, precipitating the copper from the solution as cupric sulfid by means of hydrogen sulfid, thus regenerating the solvent, reducing the cupric sulfid to cuprous sulfid by means of a hydrocarbon with the simultaneous production of hydrogen sulfid, and using the hydrogen sulfid thus produced for the precipitation of cupric sulfid from a further quantity of the copper solution; substantially as described.

2. The method of recovering cuprous sulfid from ores and the like, which consists in leaching out the copper therefrom by a suitable solvent, precipitating the copper from the solution as cupric sulfid, thus regenerating the solvent, adding elemental sulfur to the cupric sulfid thus obtained in amount equal to one-half of the sulfur contained in the cupric sulfid, reducing the cupric sulfid to cuprous sulfid by means of a hydrocarbon with the simultaneous production of hydrogen sulfid by the union of the hydrogen of the hydrocarbon with the freed sulfur of the cupric sulfid and with the added elemental sulfur, and using the hydrogen sulfid thus produced for the precipitation of cupric sulfid from a further quantity of the copper solution; substantially as described.

In testimony whereof I affix my signature, in presence of two witnesses.

RAYMOND F. BACON.

Witnesses:
R. R. SHIVELY,
E. R. WEIDLEIN.